(12) United States Patent
Krittian et al.

(10) Patent No.: US 9,429,170 B2
(45) Date of Patent: Aug. 30, 2016

(54) DRIVE TRAIN OF A VEHICLE

(71) Applicant: Linde Hydraulics GmbH & Co. KG, Aschaffenburg (DE)

(72) Inventors: Lukas Krittian, Aschaffenburg (DE); Martin Steigerwald, Glattbach (DE); Martin Oberhausser, Aschaffenburg (DE); Alfred Langen, Aschaffenburg (DE)

(73) Assignee: Linda Hydraulics GmbH & Co. KG, Aschaffenburg (DE)

( * ) Notice: Subject to any disclaimer, the term of this patent is extended or adjusted under 35 U.S.C. 154(b) by 319 days.

(21) Appl. No.: 14/082,854

(22) Filed: Nov. 18, 2013

(65) Prior Publication Data

US 2014/0190157 A1    Jul. 10, 2014

(30) Foreign Application Priority Data

Nov. 22, 2012  (DE) .................. 10 2012 111 295

(51) Int. Cl.
| | |
|---|---|
| *F16D 31/02* | (2006.01) |
| *F15B 1/02* | (2006.01) |
| *E02F 9/22* | (2006.01) |
| *E02F 9/20* | (2006.01) |
| *B60K 6/12* | (2006.01) |
| *F02N 7/00* | (2006.01) |
| *F02N 11/08* | (2006.01) |

(52) U.S. Cl.
CPC . *F15B 1/024* (2013.01); *B60K 6/12* (2013.01); *E02F 9/2066* (2013.01); *E02F 9/2217* (2013.01); *E02F 9/2292* (2013.01); *F02N 7/00* (2013.01); *F02N 11/0814* (2013.01)

(58) Field of Classification Search
CPC .... F15B 1/024; B60K 6/12; B60K 2006/126; F02N 7/06; F02N 7/08
See application file for complete search history.

(56) References Cited

U.S. PATENT DOCUMENTS

2012/0077632 A1    3/2012   Babbitt et al.

FOREIGN PATENT DOCUMENTS

| DE | 102009001602 A1 | 9/2010 |
|---|---|---|
| DE | 102011105006 A1 | 10/2012 |
| EP | 2570381 A1 | 3/2013 |
| JP | 59023064 A | 2/1984 |
| JP | 200637820 A | 2/2006 |
| JP | 2007224737 A | 9/2007 |
| JP | 201391953 A | 5/2013 |
| WO | 2011140972 A1 | 11/2011 |
| WO | 2012125798 A1 | 9/2012 |

*Primary Examiner* — Michael Leslie
(74) *Attorney, Agent, or Firm* — The Webb Law Firm

(57) ABSTRACT

A drive train (1) has an internal combustion engine (2), a traction drive (3), and working hydraulics (4) having at least one hydraulic pump (7). A connecting line (26) leads to a hydraulic accumulator (25) and is connected to a delivery line (10) of the hydraulic pump (7) that leads to the working hydraulics (4). A shutoff valve (30) is located in the connecting line (26). The shutoff valve (30) is a check valve (31) that opens automatically and as a function of the pressure to allow a flow to the hydraulic accumulator (25). A pressure relief valve (32) is operatively associated with the connecting line (26) between the shutoff valve (30) and the hydraulic accumulator (25).

20 Claims, 3 Drawing Sheets

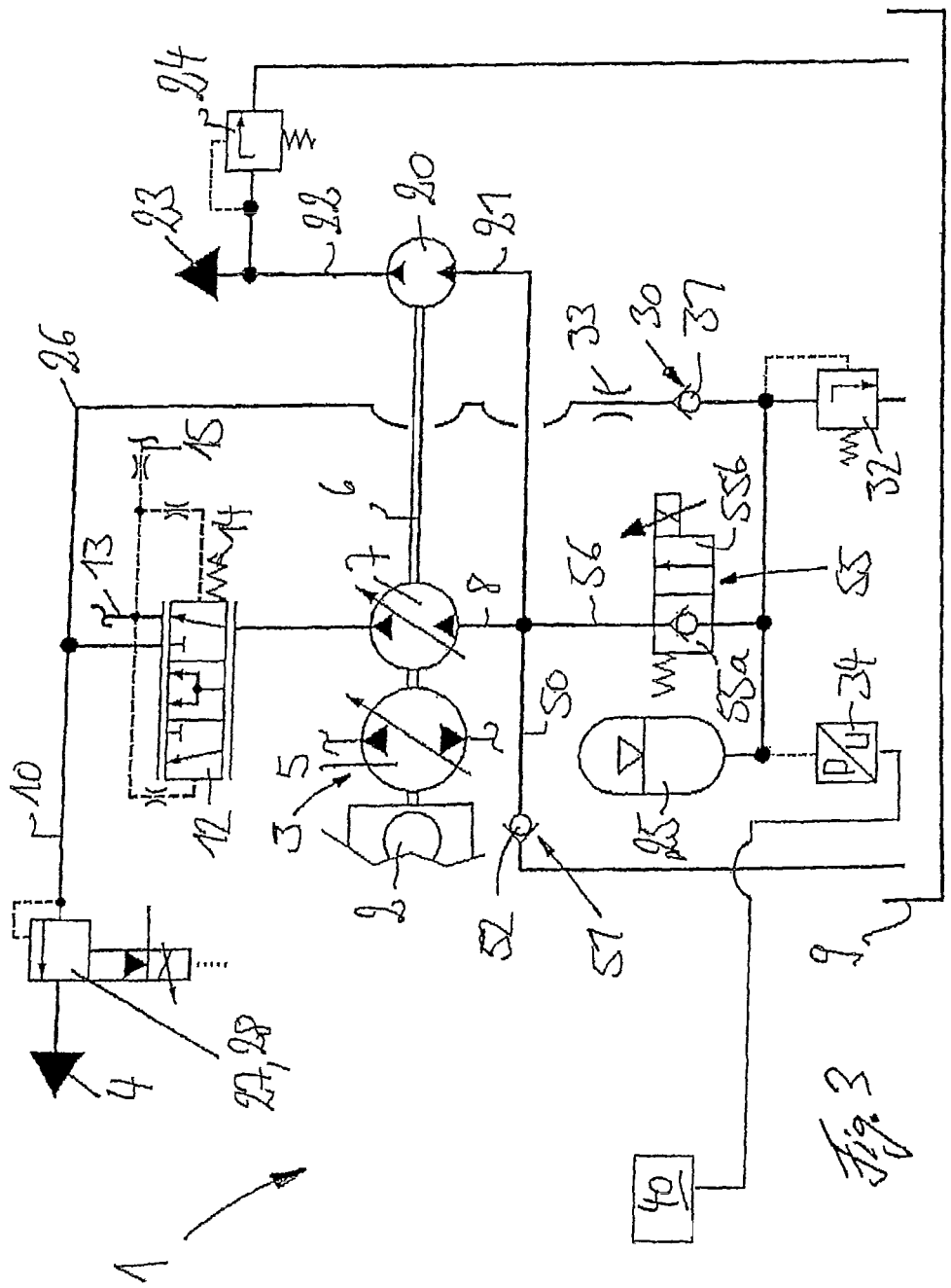

DRIVE TRAIN OF A VEHICLE

CROSS REFERENCE TO RELATED APPLICATION

This application claims priority to German Application No. DE 102012111295.6 filed Nov. 22, 2012, which is herein incorporated by reference in its entirety.

BACKGROUND OF THE INVENTION

1. Field of the Invention

This invention relates to a drive train of a vehicle, such as a mobile machine, with an internal combustion engine, a traction drive driven by the internal combustion engine, and working hydraulics driven by the internal combustion engine. The working hydraulics have at least one hydraulic pump driven by the internal combustion engine, which hydraulic pump can be operated as a pump and as a motor. When operated as a pump, the hydraulic pump takes in hydraulic fluid from a tank on a suction side (intake side) and delivers into a delivery line that leads to the working hydraulics. When the hydraulic pump is operated as a motor, the hydraulic pump is a hydraulic starter of a start-stop function to start the internal combustion engine, and is supplied with hydraulic fluid from a hydraulic accumulator on the suction side. A connecting line that leads to the hydraulic accumulator is connected to the delivery line of the hydraulic pump that leads to the working hydraulics.

2. Description of Related Art

Self-propelled mobile machines, such as industrial trucks, agricultural equipment, forestry equipment, and construction equipment such as excavators, wheeled and telescoping loaders, tractors, combine harvesters, forage harvesters, sugar beet and potato diggers, have a drive train with an internal combustion engine which drives a traction drive and which also drives the working hydraulics that perform the work functions of the machine. At least one hydraulic pump driven by the internal combustion engine is provided to supply the working hydraulics with hydraulic fluid.

During idle operation, when the traction drive and the working hydraulics are not actuated and, therefore, no torque is required from the internal combustion engine, the internal combustion engine is operated at a lower idle speed. Idle operation of this type occurs during pauses or interruptions in the work.

To reduce the fuel consumption of the internal combustion engine during pauses or interruptions in work, a start-stop function can be provided for the internal combustion engine, in which the internal combustion engine operating at no load is shut off during pauses or interruptions in work and is automatically restarted when there is a demand for torque from a work function or the traction drive. The shutoff and subsequent restarting of the internal combustion engine can occur even after relatively brief idle times, so that the starting process of the internal combustion engine is an operation that must be carried out correspondingly frequently and at short intervals during the operation of the internal combustion engine. This requirement places severe demands on the starter device of the internal combustion engine with regard to fatigue strength and the ability to deliver the starting energy required to start the internal combustion engine.

On internal combustion engines, such as diesel or gasoline engines, for example, starter devices driven by an electric motor are generally used. To start the internal combustion engine from a shutdown, the speed of rotation necessary for the self-sustaining running of the internal combustion engine is provided by an electric starter motor connected with the crankshaft of the internal combustion engine by a transmission. The transmission is generally formed by a pinion gear on the output shaft of the electric starter motor and a ring gear on the crankshaft of the internal combustion engine and has a high translation ratio so that a high-speed and compact electric starter motor can be used.

On known starter devices operated with electric motors with a high-speed and compact electric starter motor, very high currents are required to flow for a short period of time to produce the torque necessary to start the internal combustion engine. The currents that are generated to start the internal combustion engine result in a significant increase in temperature. If the internal combustion engine has to be restarted after short intervals for a start-stop function, this operating behavior results in adverse effects, such as the overheating of the electric motor, the failure of the electric starter motor, and, thus, of the starter device operated by the electric motor. To be able to actuate a conventional starter device of this type driven by an electric motor with an electrical starter motor for a start-stop function at brief intervals, the level of the electric voltage must be increased and the electric starter motor must be designed so that it has a correspondingly high fatigue strength, although that results in a significant increase in the design effort and manufacturing costs required.

On mobile machines, during the process of starting the internal combustion engine, the hydraulic pump of the working hydraulics, which is located in the drive train, also requires additional energy. Existing electric-motor driven, geared-down starter devices of the internal combustion engine are, therefore, unsuitable for economically creating a start-stop function which has the appropriate fatigue strength and supplies the necessary starting energy.

In drive trains of a similar type used in a mobile machine, hydrostatic power units are used as hydraulic starters of the internal combustion engine for a start-stop function. The hydrostatic power units are in a drive connection with the crankshaft of the internal combustion engine and are operated with hydraulic fluid from a hydraulic accumulator during a starting process of the internal combustion engine. DE 10 2011 105 006 A1 describes a drive train in which, in addition to the hydraulic pump of the working hydraulics, an additional hydraulic motor is provided that functions as a starter of the internal combustion engine to achieve a start-stop function of the internal combustion engine. Because an additional hydraulic motor is in coupled motion during the normal operation of the running internal combustion engine, losses occur which reduce the overall efficiency of the machine.

To eliminate the cost and effort required for an additional hydraulic motor as a starter of the internal combustion engine, the hydraulic pump that is already present for the working hydraulics can be used as a hydraulic starter of the internal combustion engine by operating the hydraulic pump as a motor supplied with hydraulic fluid from a hydraulic accumulator on the suction side. Drive trains of this type are known from FIGS. 1 and 2 of WO 2012/125798 A1. For charging of the hydraulic accumulator, in the system described by WO 2012/125798 A1, an electrically actuated charging valve in the form of a proportional valve that throttles the delivery line is located in the delivery line that leads from the hydraulic pump of the working hydraulics to the working hydraulics. Upstream of the charging valve, a connecting line that leads to the hydraulic accumulator and in which an electrically actuated shutoff valve is located is connected to the delivery line. The electrically actuated shutoff valve is actuated into an open position for charging of the hydraulic accumulator, and when a defined accumulator charge pressure (which is monitored by a pressure sensor) is reached, the shutoff valve is actuated back into the closed position to shut off the flow to the hydraulic accumulator. However, an electrically actuated shutoff valve of this type in the connecting line that connects the delivery line with the hydraulic accumulator results in high manufacturing costs and takes up a great deal of space. Additionally, a malfunction of the electrically actuated shutoff valve, such as a sticking in the open position, results in the charging of the hydraulic accumulator to unacceptably high accumulator charge pressures.

Therefore, it is an object of this invention to provide a drive train of the general type described above but which is improved in terms of manufacturing cost and space requirements for a charging circuit of the hydraulic accumulator and offers effective protection of the accumulator charge pressure.

SUMMARY OF THE INVENTION

To accomplish this object, the invention teaches that located in the connecting line is a shutoff valve that opens automatically and as a function of pressure to open the flow to the hydraulic accumulator. The shutoff valve can be a check valve that opens the flow to the hydraulic accumulator. A pressure relief valve is associated with the connecting line between the shutoff valve and the hydraulic accumulator. The invention, therefore, teaches that in the connecting line that leads from the delivery line to the hydraulic accumulator, by means of which the hydraulic accumulator is charged from the delivery line of the working hydraulics, there is a simply constructed shutoff valve that opens and closes automatically and as a function of the pressure. The shutoff valve is preferably a simple check valve, which requires very little in the way of manufacturing costs and effort. With a shutoff valve of this type, the hydraulic accumulator can be charged in a simple manner with hydraulic fluid when the shutoff valve is in the open position and, after the charging process, the hydraulic accumulator charged with hydraulic fluid can be shut off in the shutoff position of the shutoff valve. The charge pressure present in the hydraulic accumulator can also be secured in a simple manner with a pressure relief valve, which is associated with the connecting line between the shutoff valve and the hydraulic accumulator.

The hydraulic accumulator can be charged during an actuation of a hydraulic consumer of the working hydraulics. In one advantageous development of the invention, to ensure a sufficient volume flow to the actuated consumer during the simultaneous charging of the hydraulic accumulator and, thus, that the actuated consumer can be operated at a desired speed of movement, a flow control device, such as a diaphragm or throttle, is located in the connecting line. With a flow control device in the form of a throttle or diaphragm in the connecting line that leads to the hydraulic accumulator, the charging volume flow into the hydraulic accumulator can be limited in a simple manner.

In one development of the invention, a charging valve for charging of the hydraulic accumulator that throttles the flow in the delivery line is located in the delivery line of the hydraulic pump that leads to the working hydraulics. The connecting line is connected to the delivery line upstream of the charging valve. With a charging valve of this type, even in operating conditions in which no consumer of the working hydraulics is actuated, the delivery line can be throttled to make possible a charging of the hydraulic accumulator by the delivery flow delivered by the hydraulic pump operating as a pump.

It is particularly advantageous if, as in an additional embodiment of the invention, the charging valve is a retarder valve which, when the vehicle is braked, is actuated into a throttle position that throttles the delivery line. With a retarder valve of this type, by throttling the delivery line of the hydraulic pump when the vehicle is braking, an additional braking torque can be impressed on the output shaft formed by the crankshaft, which counteracts the torque that acts as a motor on the drive pump and, thus, decelerates the vehicle. During braking operation with a retarder valve of this type, it is also possible to recover the braking energy and to charge the hydraulic accumulator so that the kinetic energy of the vehicle during a braking process is used to charge the hydraulic accumulator.

The connection of the hydraulic accumulator with the suction side of the hydraulic pump can advantageously be controlled by an electrically actuated control valve. With an electrically actuated control valve, it is possible in a simple manner to control the operation of the hydraulic pump as a motor during a starting process of the shut-off internal combustion engine.

The control valve is preferably located in a branch line that runs from the connecting line between the shutoff valve and the hydraulic accumulator to an intake line of the hydraulic pump, which leads from the tank to the suction side of the hydraulic pump.

If a shutoff valve that shuts off the flow to the tank, such as a check valve that shuts off the flow to the tank, is located in the intake line that leads from the tank to the suction side of the hydraulic pump, it is possible in a simple manner, when the hydraulic pump is operated as a motor, to prevent an outflow of hydraulic fluid from the hydraulic accumulator into the tank, and when the hydraulic pump is operated as a pump, to suck hydraulic fluid out of the tank.

If, as in one embodiment of the invention, a pressure sensor is associated with the connecting line between the shutoff valve and the hydraulic accumulator, it is easily possible, in connection with an electronic control device that controls a charging valve, to control the charging process of the hydraulic accumulator and in connection with the control valve to control the discharge operation of the hydraulic accumulator.

In one development of the invention, the hydraulic pump supplies hydraulic fluid to a hydraulic steering device. Associated with the delivery side of the hydraulic pump is a priority valve for the priority supply of the hydraulic steering system, to the output side of which the delivery line of the working hydraulics is connected. When the hydraulic pump is operatively associated with a priority valve of this type, it becomes easily possible to guarantee the priority supply of a steering device. As a result of the connection of the connecting line of the hydraulic accumulator to the delivery line that leads from the priority valve to the working hydraulics, the process of charging the hydraulic accumulator has no effect on the prioritization and the priority of the steering device.

In one advantageous development of the invention, the drive train includes a charge pump driven by the internal combustion engine, which charge pump can be operated as a pump and motor. When the charge pump is operated as a pump, the suction side sucks hydraulic fluid out of the tank and delivers into a charge pressure line that leads to a charging circuit. When the charge pump is operated as a motor, it can be supplied with hydraulic fluid from the hydraulic accumulator on the suction side. With a charge pump of this type, which can also be operated as a motor with hydraulic fluid from the hydraulic accumulator, during a starting process, the torque to start the internal combustion engine can be increased in a simple manner. In addition, with a charge pump of this type that can be operated as a motor, a booster drive can be created and additional torque can be introduced into the drive train, by means of which the running internal combustion engine can be assisted during an acceleration process or in the traction operation of the vehicle when it is traveling at a steady speed, as well as in the actuation of the working hydraulics. The hydrostatic booster drive formed by the charge pump can also be used to downsize the internal combustion engine.

In one advantageous embodiment of the invention, the connection of the hydraulic accumulator with the suction side of the charge pump can be controlled by an additional electrically actuated control valve. As a result, it becomes possible in a simple manner to control the operation as a motor of the hydraulic pump of the working hydraulics and the operation of the charge pump as a motor separately from one another, each by means of a control valve, so that when the hydraulic pump of the working hydraulics is being operated as a pump and, thus, the working hydraulics are actuated by the operation of the charge pump as a motor, the internal combustion engine can be boosted by additional torque from the charge pump.

The additional control valve is advantageously located in the branch line that runs from the connecting line between the shutoff valve and the hydraulic accumulator to an intake line of the charge pump, which leads from the tank to the suction side of the charge pump.

If a shutoff valve that shuts off the flow to the tank, such as check valve that shuts off the flow to the tank, is located in the intake line that leads from the tank to the suction side of the charge pump, when the charge pump is operated as a motor it is possible in a simple manner to prevent an outflow of hydraulic fluid from the hydraulic accumulator into the tank, and when the charge pump is operated as a pump, to achieve a suction of hydraulic fluid out of the tank.

In one alternative embodiment of the invention, the hydraulic pump of the working hydraulics and the charge pump have a common intake (suction) channel, which connects the suction side of the hydraulic pump and the suction side of the charge pump with the tank, and in which is located a shutoff valve which shuts off the flow to the tank, for example, a check valve that shuts off the flow to the tank. The hydraulic accumulator can be connected by a common electrically actuated control valve with the common intake channel of the hydraulic pump and of the charge pump. This arrangement results in a simple construction with only one single shutoff valve and one single control valve, and makes it possible, when the hydraulic pump of the working hydraulics and the charge pump are operated as motors, to make available a high torque to start the internal combustion engine in the drive train.

The common control valve is advantageously located in a branch line which leads from the connecting line between the shutoff valve and the hydraulic accumulator to the common intake channel of the hydraulic pump and the charge pump.

The charge pump, which can be operated as a pump and a motor, can act in addition to the hydraulic pump of the working hydraulics (being operated as a motor) to function as a hydraulic starter to start the internal combustion engine. Alternatively or additionally, the charge pump (being operated as a motor) can be a booster drive to transmit torque into the drive train driven by the running internal combustion engine. This arrangement reduces the fuel consumption of the internal combustion engine and the booster drive achieved by operating the charge pump as a motor makes possible a downsizing of the internal combustion engine.

The hydraulic pump of the working hydraulics can be a constant displacement pump with a fixed displacement volume or a variable displacement pump with a variable displacement volume.

The hydraulic pump of the working hydraulics is advantageously an axial piston machine, preferably an axial piston machine that employs the swashplate construction, or a radial piston machine, or a gear machine.

BRIEF DESCRIPTION OF THE DRAWINGS

Additional advantages and details of the invention are explained in greater detail on the basis of the exemplary embodiments illustrated in the accompanying schematic figures, in which like reference numbers identify like parts throughout.

FIG. 3 is a modification of the embodiment illustrated in FIG. 2.

DESCRIPTION OF THE PREFERRED EMBODIMENTS

Figure 1:
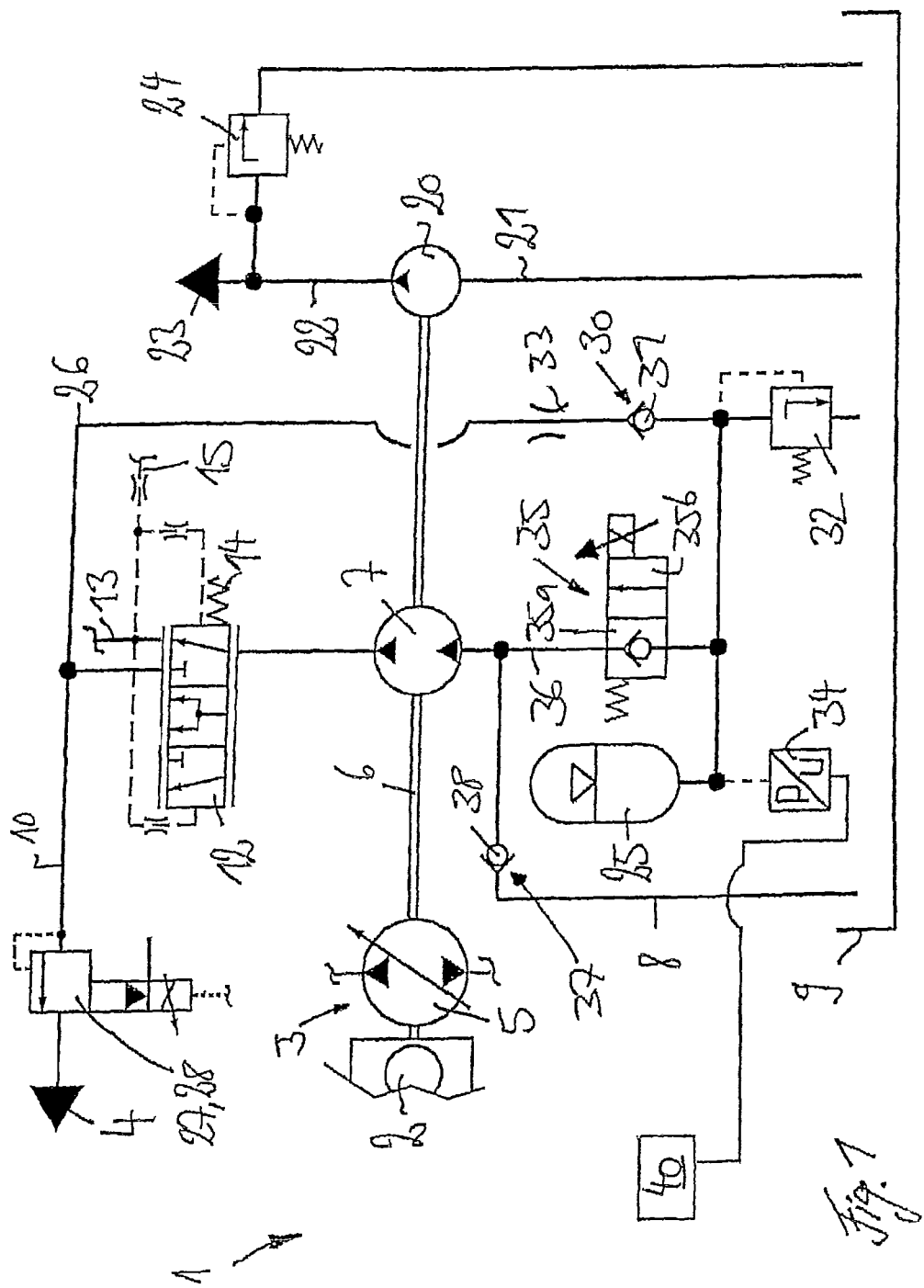
FIG. 1 is a schematic illustration of a first exemplary embodiment of a drive train of the invention.

FIG. 1 is a schematic illustration of a drive train 1 of the invention of a mobile machine, e.g., of an industrial truck or a piece of construction or agricultural equipment.

The drive train 1 includes an internal combustion engine 2, such as a diesel engine, for example, a traction drive 3 driven by the internal combustion engine 2, and working hydraulics 4 driven by the internal combustion engine 2.

In the illustrated exemplary embodiment, the traction drive 3 is a hydrostatic traction drive which includes a variable displacement drive pump 5 driven by a connection with an output shaft 6 of the internal combustion engine 2. The drive pump 5 is in communication with one or more fixed or variable intake hydraulic motors in a closed-circuit, and which hydraulic motors are in an operative connection with the driven wheels of the machine in a conventional manner.

The traction drive 3 can alternatively be an electric traction drive with an electric generator driven by the internal combustion engine 2 and one or more electric traction motors. The traction drive 3 can also be a mechanical traction drive with a mechanical transmission, such as a multi-speed gear transmission, or a power split transmission, or a torque converter transmission.

The working hydraulics 4 comprise the work functions of the machine, such as on an industrial truck, for example, working hydraulics to actuate load handling means on a lifting mast, or on a piece of construction equipment in the form of an excavator, for example, the work functions of the working apparatus in the form of a shovel.

In the illustrated exemplary embodiment, the working hydraulics 4 comprise at least one hydraulic pump 7 operated in an open circuit and driven by a drive connection with the output shaft 6 of the internal combustion engine 2. The hydraulic pump 7 of the working hydraulics 4 in the exemplary embodiment illustrated in FIG. 1 is a constant displacement pump with a constant displacement volume.

The hydraulic pump 7 is in communication on its input side (the suction side) with a tank 9 by an intake line 8. A delivery line 10, which is in connection on the output side with the delivery side of the hydraulic pump 7, is connected to a control valve device, by means of which it is possible to control the hydraulic consumers of the working hydraulics 4.

The control valve device preferably comprises one or more directional control valves for actuation of the consumers. In the illustrated exemplary embodiment, there is also a priority valve 12 with which the priority supply of a consumer supplied by the hydraulic pump 7, such as a hydraulic steering device, for example, can be ensured. The priority valve 12 is in communication on the input side with the delivery side of the hydraulic pump 7 and is in communication on the output side with the delivery line 10 that leads to the working hydraulics 4 and also with a delivery line 13 that leads to the steering device. The priority valve 12 is controlled by a spring 14 and by the load pressure of the steering device which is present in the load pressure line 15.

The drive train 1 further comprises a charge pump 20 driven by the output shaft 6. The charge pump 20 is a constant displacement pump with a constant displacement volume which is operated in an open circuit. The charge pump 20 is in communication on the suction side by means of an intake line 21 with the tank 9 and delivers into a charge pressure line 22 connected to the delivery side, and to which the corresponding consumers of a charging circuit 23 are connected, such as displacement devices to adjust the displacement volume of the traction pump 5, a charge device of the hydrostatic traction drive, a braking device of the vehicle, and pilot valves for the control valves of the working hydraulics 4. To ensure the charge pressure in the charging pressure circuit 23, a pressure limiting device 24, such as a pressure relief valve, is operatively associated with the charge pressure line 22.

In the drive train 1, the hydraulic pump 7 of the working hydraulics 4 is a two-quadrant power unit which can be operated as a pump and a motor in the same direction of operation and the same flow direction of the hydraulic fluid.

When it is operated as a pump, the hydraulic pump 7 sucks in hydraulic fluid from the tank 9 via the intake line 8 and delivers the hydraulic fluid via the priority valve 12 into the delivery line 10 of the working hydraulics 4 and/or the delivery line 13 of the steering device. When the hydraulic pump 7 is operated as a motor, in which the hydraulic pump 7 acts as the hydraulic starter of a start-stop function to start the internal combustion engine 2, the hydraulic pump 7 is driven on the suction side with hydraulic fluid from a hydraulic accumulator 25.

To charge the hydraulic accumulator 25 with hydraulic fluid, the hydraulic accumulator 25 is connected to the delivery line 10 of the hydraulic pump 7 that leads to the working hydraulics 4 by means of a connecting line 26.

Located in the delivery line 10 is an electrically actuated charging valve 27 which, when actuated, can be actuated into a throttling position in which it throttles the delivery line 10 to build up a pressure. The charging valve 27 is preferably a retarder valve 28 which, during the braking of the vehicle, is actuated into a throttling position so that the vehicle can be decelerated by building up pressure in the delivery line 10 and by means of the drag torque of the internal combustion engine 2. The connecting line 26 is connected to the delivery line 10 upstream of the charging valve 27 and, therefore, between the charging valve 27 and the priority valve 12.

Located in the connecting line 26 is a shutoff valve 30, which in the illustrated example is a check valve 31 that opens automatically and as a function of the pressure to allow flow to the hydraulic accumulator 25. Also associated with the connecting line 26 between the shutoff valve 30 and the hydraulic accumulator 25 is a pressure relief valve 32 to control the pressure in the hydraulic accumulator 25. Also located in the connecting line 26 to limit the charge volume flow of the hydraulic accumulator 25 is a flow control device 33, which can be a diaphragm or throttle. The flow control device 33 can, as illustrated, be located upstream of the shutoff valve 30 or, alternatively, downstream of the shutoff valve 30.

Also associated with the connecting line 26 between the shutoff valve 30 and the hydraulic accumulator 25 is a pressure sensor 34. The pressure sensor 34 monitors the charge pressure and, thus, the charging status of the hydraulic accumulator 25.

The connection of the hydraulic accumulator 25 with the suction side of the hydraulic pump 7 for the operation of the hydraulic pump 7 as a motor can be controlled by a first electrically actuated control valve 35. The control valve 35 has a closed position 35a and an open position 35b. The closed position 35a is preferably leak-tight with a shutoff valve that shuts off the flow to the hydraulic pump 7.

The control valve 35 is located in a branch line 36 that runs from the connecting line 26 between the shutoff valve 30 and the hydraulic accumulator 25 to the intake line 8 that runs to the suction side of the hydraulic pump 7.

Located in the intake line 8 of the hydraulic pump 7 is a shutoff valve 37 that shuts off the flow to the tank 9 and is preferably a check valve 38 that shuts off the flow to the tank 9.

An electronic control device 40 is in communication on the input side with the pressure sensor 34 and actuates the charging valve 27 and the control valve 35.

Figure 2:
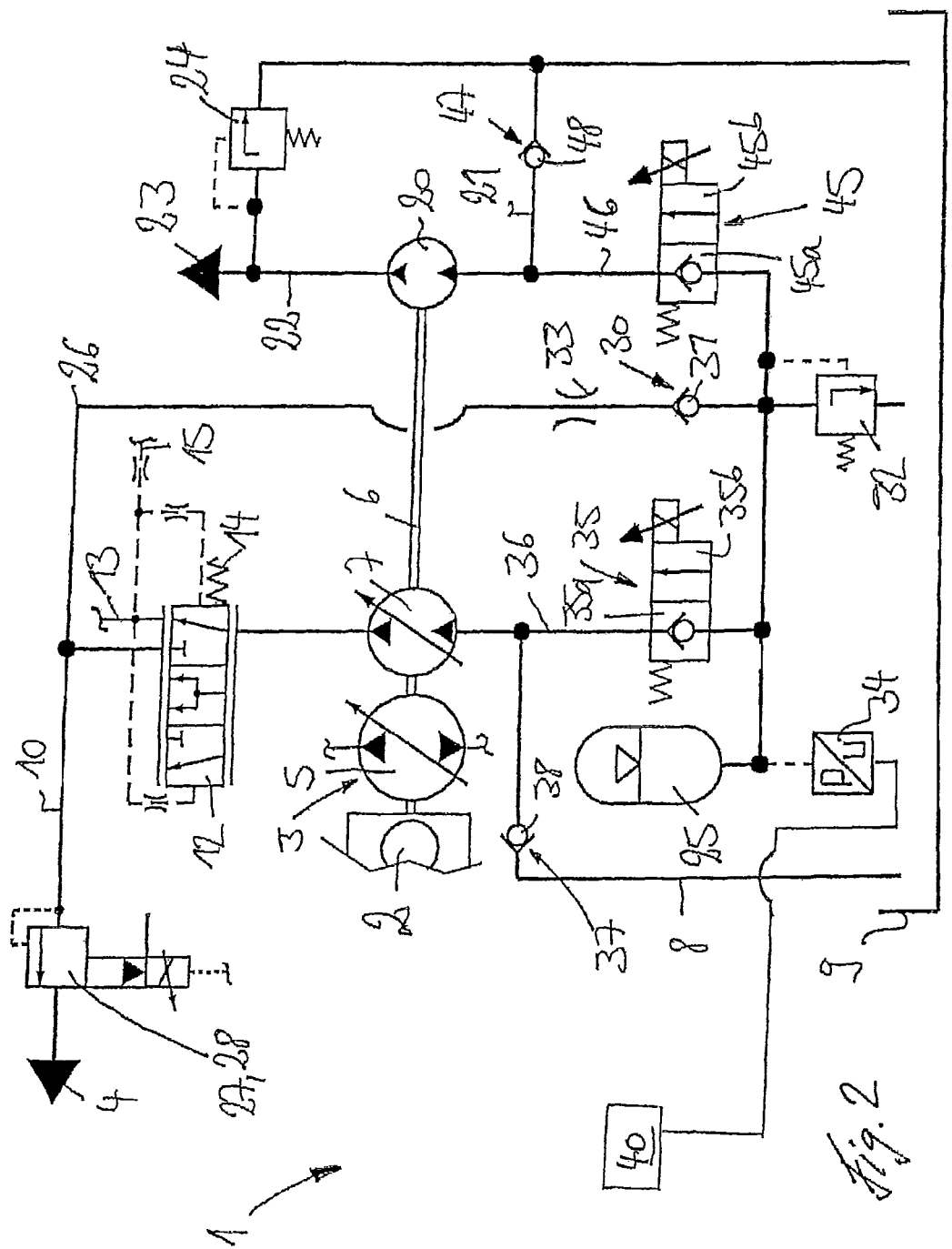
FIG. 2 is a schematic illustration of a second exemplary embodiment of a drive train of the invention.

FIG. 2 illustrates a second exemplary embodiment of the invention, in which the hydraulic pump 7, that can be operated as a pump and a motor, is in the form of a variable displacement pump with a variable displacement volume, such as an axial piston machine utilizing a swashplate construction, to supply the working hydraulics 4 and the steering device.

In FIG. 2, the charge pump 20 is also a two-quadrant power unit which can be operated as a pump and motor in the same direction of rotation and the same direction of flow of the hydraulic medium.

When operating as a pump, the charge pump 20, by means of the intake line 21 connected to the suction side, sucks hydraulic fluid out of the tank 9 and delivers it into the charge pressure line 22, which is connected with the delivery side of the charge pump 20. When the charge pump 20 is operating as a motor, in which the charge pump 20, in addition to the hydraulic pump 7, acts as a hydraulic starter of a start-stop function to start the internal combustion engine 2 and/or as a booster drive to assist the running internal combustion engine 2, the charge pump 20 is driven on the suction side with hydraulic fluid from the hydraulic accumulator 25.

An additional electrically actuated control valve 45 is provided to control the connection of the hydraulic accumulator 25 with the suction side of the charge pump 20 for operation of the charge pump 20 as a motor. The control valve 45 has a closed position 45a and an open position 45b. The closed position 45a is preferably leak-tight with a shutoff valve that shuts off the flow to the charge pump 20.

The additional control valve 45 is located in a branch line 46 that leads from the hydraulic fluid line 26 between the shutoff valve 30 and the hydraulic accumulator 25 to the intake line 21 of the charge pump 20. The additional control valve 45 can also be actuated by the electronic control device 40.

Also located in the intake line 21 that leads from the tank 9 to the suction side of the charge pump 20 is a shutoff valve 47 that blocks the flow toward the tank 9, and is preferably a check valve 48 that shuts off the flow to the tank 9.

FIG. 3 shows a development of a drive train 1 in which the hydraulic pump 7 and the charge pump 20 are each in the form of two-quadrant power units that can be operated as pump and motor.

The hydraulic pump 7 of the working hydraulics 4 and the charge pump 20 have a common suction (intake) channel 50, which connects the suction side (and, thus, the intake line 8) of the hydraulic pump 7 and the suction side (and, thus, the intake line 21) of the charge pump 20 with the tank 9. Located in the common suction (intake) channel 50 is a shutoff valve 51 that shuts off the flow to the tank, and is preferably a check valve 52 that shuts off the flow to the tank.

To control the connection of the suction sides of the hydraulic pump 7 and of the charge pump 20 for operation of the two power units as motors, there is a common electrically actuated control valve 55. The control valve 55 has a closed position 55a and an open position 55b. The closed position 55a is preferably leak-tight with a shutoff valve that shuts off the flow to the suction inlet 50. The control valve 55 can be actuated by the electronic control device 40.

The common control valve 55 is located in a connecting line 56 which leads from the connecting line 26 between the shutoff valve 30 and the hydraulic accumulator 25 to the common suction channel 50 of the hydraulic pump 7 and of the charge pump 20.

The control valves 35, 45, 55 in FIGS. 1 to 3 can be switching valves or proportional valves that throttle the flow in intermediate positions.

In the drive train 1 illustrated in FIGS. 1 to 3, the hydraulic accumulator 25 can be charged with hydraulic fluid in a simple manner by the flow control device 33 and the check valve 31 when a consumer of the working hydraulics 4 is actuated, if the load pressure of the consumer exceeds the charge pressure of the hydraulic accumulator 25. By means of a corresponding actuation of the charging valve 27 into a throttling position, the hydraulic accumulator 25 can also be charged by the flow control device 33 and the check valve 31 under operating conditions in which the internal combustion engine 2 has reserves of power. It is particularly advantageous if the charging valve 27 is a retarder valve 28 and is actuated into a throttling position during braking operation of the vehicle, in which case the kinetic energy of the decelerating vehicle is used to charge the hydraulic accumulator 25, and, thus, energy can be recovered. During the deceleration of the vehicle by the hydrostatic traction drive 3, the drive pump 5 operates as a motor, which drives the hydraulic pump 7 of the working hydraulics 4 so that the hydraulic accumulator 25 can be charged with hydraulic fluid by means of the retarder valve 28 actuated into the throttling position.

When the consumers of the working hydraulics 4 are actuated, the hydraulic pump 7 delivers a delivery flow for the actuation of the consumers of the working hydraulics 4 and also delivers a delivery flow to charge the hydraulic accumulator 25. To charge the hydraulic accumulator 25, the hydraulic pump 7 can be driven on the input side by the power supplied by the internal combustion engine 2. In connection with the retarder valve 28, the hydraulic pump 7 is driven to charge to the hydraulic accumulator 25 with the kinetic energy of the vehicle recovered during the deceleration of the vehicle when it is braked.

When the hydraulic pump 7 of the working hydraulics 4 is operated as a motor, it acts as a hydraulic starter for the shut-off internal combustion engine 2 to achieve a start-stop function. With reference to FIG. 1, when there is sufficient pressure in the hydraulic accumulator 25, the control valve 35 is actuated into the open position 35b. The shutoff valve 37 in the intake line 8 prevents a discharge of the hydraulic fluid from the hydraulic accumulator 25 into the tank 9. As soon as the starting speed of the internal combustion engine 2 has been exceeded, as determined by a rotational speed sensor associated with the internal combustion engine 2 or the output shaft 6 and connected with the control device 40, the control valve 35 is actuated into the closed position 35a to prevent a further emptying of the hydraulic accumulator 25.

In FIG. 3, by the additional operation of the charge pump 20 as a motor in the open position 55b of the control valve 55, the hydraulic pump 7 and the charge pump 20 together form a hydraulic starter for the shut-off internal combustion engine 2. To achieve a start-stop function, the torque can be increased in a simple manner to start the internal combustion engine 2.

In FIG. 2, to start the shut-off internal combustion engine 2 with the hydraulic pump 7 operated as a motor by the additional actuation of the additional control valve 45 into the open position 45b, the torque to start the internal combustion engine 2 can be increased in a simple manner by the additional operation of the charge pump 20 as a motor. In addition, in FIG. 2, it is possible with the two control valves 35, 45 to operate the charge pump 20 alone as a motor by only actuating the control valve 45 into the open position 45b to provide a booster drive by the charge pump 20 being operated as a motor. The charge pump 20, with the internal combustion engine 2 running, introduces an additional torque into the drive train 1, which assists the internal combustion engine 2. By operating the charge pump 20 as a motor, the acceleration of the vehicle can be assisted by the booster drive and the additional torque provided by the charge pump 20, by connecting the hydraulic accumulator 25 via the control valve 45 with the charge pump 20 at the start of the acceleration process of the vehicle. The duration of the boost process can be limited as a function of the charged status of the hydraulic accumulator 25, which is measured by the pressure sensor 34. If, when the vehicle has finished accelerating, there is still sufficient hydraulic fluid in the hydraulic accumulator 25, the charge pump 20 can continue to be operated as a motor even during travel of the vehicle at the steady target speed to utilize the momentum from the booster drive of the charge pump 20. In the same manner, by using the charge pump 20 alone as a motor by means of the control valve 45, the internal combustion engine 2 can be assisted with additional torque from the booster operation of the charge pump 20 when one or more consumers of the working hydraulics 4 are actuated, in which case the hydraulic pump 7 works as a pump.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breath of the appended claims and any and all equivalents thereof.

The invention claimed is:

1. A drive train of a vehicle, comprising:
an internal combustion engine;
a traction drive driven by the internal combustion engine;
working hydraulics driven by the internal combustion engine, wherein the working hydraulics include at least one hydraulic pump driven by the internal combustion engine, which at least one hydraulic pump is operable as a pump and as a motor, wherein the hydraulic pump, when operated as a pump, sucks hydraulic fluid from a tank on a suction side of the hydraulic pump and delivers into a delivery line that leads to the working hydraulics, and wherein the hydraulic pump, when operated as a motor, forms a hydraulic starter of a start-stop function to start the internal combustion engine and is supplied with hydraulic fluid from a hydraulic accumulator on the suction side;

a connecting line that leads to the hydraulic accumulator is connected to the delivery line of the hydraulic pump that leads to the working hydraulics;

a shutoff valve located in the connecting line, wherein the shutoff valve opens automatically and as a function of pressure to allow a flow to the hydraulic accumulator; and a pressure relief valve operatively associated with the connecting line between the shutoff valve and the hydraulic accumulator.

2. The drive train as recited in claim 1, including a flow control device located in the connecting line.

3. The drive train as recited in claim 1, wherein located in the delivery line of the hydraulic pump that leads to the working hydraulics is a charging valve that throttles the delivery line to charge the hydraulic accumulator, and wherein the connecting line is connected to the delivery line upstream of the charging valve.

4. The drive train as recited in claim 3, wherein the charging valve is a retarder valve which, during braking operation of the vehicle, is actuated into a throttle position that throttles the delivery line.

5. The drive train as recited in claim 1, wherein a connection of the hydraulic accumulator with the suction side of the hydraulic pump is controlled by an electrically actuated control valve.

6. The drive train as recited in claim 5, wherein the control valve is located in a branch line which runs from the connecting line between the shutoff valve and the hydraulic accumulator to an intake line of the hydraulic pump, which intake line runs from the tank to the suction side of the hydraulic pump.

7. The drive train as recited in claim 6, including another shutoff valve located in the intake line that runs from the tank to the suction side of the hydraulic pump, which another shut off valve shuts off flow to the tank, and wherein the another shutoff valve is a check valve.

8. The drive train as recited in claim 1, including a pressure sensor operatively associated with the connecting line between the shutoff valve and the hydraulic accumulator.

9. The drive train as recited in claim 1, wherein the hydraulic pump supplies hydraulic fluid to a hydraulic steering device, and wherein a priority valve is operatively associated with the delivery side of the hydraulic pump for priority supply of the hydraulic steering system, and wherein the delivery line of the working hydraulics is connected to an output side of the priority valve.

10. The drive train as recited in claim 1, including a charge pump driven by the internal combustion engine, wherein the charge pump is operable as a pump and as a motor, wherein when the charge pump is operated as a pump sucks hydraulic fluid via a suction side from the tank and delivers into a charge pressure line that leads to a charging circuit, and wherein the charge pump when operated as a motor is supplied on the suction side with hydraulic fluid from the hydraulic accumulator.

11. The drive train as recited in claim 10, wherein the connection of the hydraulic accumulator with the suction side of the charge pump is controlled by an additional electrically actuated control valve.

12. The drive train as recited in claim 11, wherein the additional control valve is located in a branch line which leads from the connecting line between the shutoff valve and the hydraulic accumulator to an intake line of the charge pump, which intake line leads from the tank to the suction side of the charge pump.

13. The drive train as recited in claim 12, including a further shutoff valve that shuts off flow to the tank, wherein the further shutoff valve is a check valve located in the intake line that leads from the tank to the suction side of the charge pump.

14. The drive train as recited in claim 10, wherein the hydraulic pump of the working hydraulics and the charge pump have a common intake channel which connects the suction side of the hydraulic pump and the suction side of the charge pump with the tank and in which is located an intake channel shutoff valve in the form of a check valve that shuts off flow to the tank, wherein the hydraulic accumulator is connected by a common electrically actuated control valve with the common intake channel of the hydraulic pump and of the charge pump.

15. The drive train as recited in claim 14, wherein the common control valve is located in a branch line which runs from the connecting line between the shutoff valve and the hydraulic accumulator to the common intake channel of the hydraulic pump and of the charge pump.

16. The drive train as recited in claim 10, wherein the charge pump functions as a hydraulic starter to start the internal combustion engine and/or a booster drive to deliver torque to the drive train driven by the running internal combustion engine.

17. The drive train as recited in claim 1, wherein the hydraulic pump of the working hydraulics is selected from the group consisting of a constant displacement pump with a constant displacement volume and a variable displacement pump with a variable displacement volume.

18. The drive train as recited in claim 1, wherein the hydraulic pump is selected from the group consisting of an axial piston machine and a radial piston machine and a gear machine.

19. The drive train as recited in claim 1, wherein the shutoff valve is a check valve that opens to allow a flow to the hydraulic accumulator.

20. The drive train as recited in claim 2, wherein the flow control device is selected from the group consisting of a diaphragm and a throttle.

* * * * *